US006842264B1

(12) United States Patent
Leyva et al.

(10) Patent No.: US 6,842,264 B1
(45) Date of Patent: Jan. 11, 2005

(54) PRINTER SYSTEM AND METHOD FOR PROTOCOL VERSION TRANSLATION UTILIZING TRANSLATION TABLES

(75) Inventors: Ricardo Osuna Leyva, Boise, ID (US); Lawrence Bert Newell, Jr., Meridian, ID (US); Carlos F. Becerra, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1062 days.

(21) Appl. No.: 09/633,727

(22) Filed: Aug. 7, 2000

(51) Int. Cl.[7] .............................................. G06K 15/00
(52) U.S. Cl. ..................................... 358/1.15; 358/1.13
(58) Field of Search .............................. 358/1.15, 1.13, 358/1.1; 715/511, 509, 516, 523; 370/400, 254

(56) References Cited

U.S. PATENT DOCUMENTS

| 5,604,843 A | 2/1997 | Shaw et al. ................. 395/101 |
| 5,678,039 A | 10/1997 | Hinks et al. ................. 395/604 |
| 6,038,233 A | 3/2000 | Hammoto et al. ........... 370/401 |
| 6,112,024 A | * 8/2000 | Almond et al. .............. 717/122 |

* cited by examiner

Primary Examiner—Arthur G. Evans (57) ABSTRACT

A printer that contains printer devices that use different versions of a protocol is configured with a translation layer in printer firmware that receives one version of a protocol command from a sending device, translates the protocol command to another version of the protocol command, and sends the translated command to a receiving device or devices. The translation layer includes a table of modified commands that identifies each command used in the versions of the protocol used by the printer devices. The table of modified commands is used to generate a translation table for each device. The translation table is used to find a command that is compatible with a receiving device when the receiving device uses a different version of the command than the sending device. If the command has not changed in the protocol versions used by the sending and receiving devices, then the translation facility is not invoked and print processing proceeds normally.

20 Claims, 5 Drawing Sheets

Fig. 1

| | COMMAND | VERSION 1 | VERSION 2 | VERSION 3 |
|---|---|---|---|---|
| 210 | | | | |
| 212 | COMMAND ONE | X | | |
| 214 | COMMAND TWO | X | | |
| 216 | COMMAND THREE | X | | |
| 218 | COMMAND FOUR | X | | |
| 220 | COMMAND FIVE | X | | X |
| 222 | COMMAND SIX | X | X | |
| | COMMAND SEVEN | | X | X |

202    204    206    208

TABLE OF MODIFIED COMMANDS
140

*Fig. 2*

| | COMMAND | DEVICE C | DEVICE D |
|---|---|---|---|
| 308 → | COMMAND | DEVICE C | DEVICE D |
| 310 → | COMMAND FIVE | VERSION 2 | VERSION 3 |
| | COMMAND SIX | VERSION 2 | VERSION 2 |

302 — 304 — 306 —

TRANSLATION TABLE A AND TRANSLATION TABLE B
116, 122

*Fig. 3a*

| | COMMAND | DEVICE A | DEVICE B | DEVICE D |
|---|---|---|---|---|
| 320 → | COMMAND | DEVICE A | DEVICE B | DEVICE D |
| 322 → | COMMAND FIVE | | | VERSION 3 |
| 324 → | COMMAND SIX | VERSION 1 | VERSION 1 | |
| | COMMAND SEVEN | INCOMPATIBLE | INCOMPATIBLE | VERSION 3 |

312 — 314 — 316 — 318 —

TRANSLATION TABLE C
126

*Fig. 3b*

| | COMMAND | DEVICE A | DEVICE B | DEVICE C |
|---|---|---|---|---|
| 334 → | COMMAND | DEVICE A | DEVICE B | DEVICE C |
| 336 → | COMMAND FIVE | VERSION 1 | VERSION 1 | VERSION 1 |
| 338 → | COMMAND SIX | VERSION 1 | VERSION 1 | |
| | COMMAND SEVEN | INCOMPATIBLE | INCOMPATIBLE | VERSION 2 |

326 — 328 — 330 — 332 —

TRANSLATION TABLE D
132

PRINTER SYSTEM AND METHOD FOR PROTOCOL VERSION TRANSLATION UTILIZING TRANSLATION TABLES

TECHNICAL FIELD

The invention relates to printers having multiple devices that utilize more than one version of a protocol. More particularly, the invention relates to systems and methods for utilizing a translation table for protocol command translation between printer devices.

BACKGROUND

Most printers incorporate several printer devices, such as input trays, stackers, staplers, sorters, etc., to provide users with a comprehensive printing system. These devices are controlled by a paper handler controller (sometimes referred to simply as a controller) that is integrated into hardware and firmware that is resident within printer memory. The paper handler controller (PHC) coordinates the functions of the devices according to user instructions.

For example, say that a user wants to print several copies of a multi-page document on both sides of letter-size paper and collate and staple the printed documents. The paper handler controller receives instructions from the user and commands appropriate printer devices to function to print the documents appropriately.

In the present example, the paper handler controller must transmit commands that direct an input tray to load paper from a letter-size paper tray, a duplexer to guide each sheet of paper so that both sides are utilized; a sorter to sort the output pages, and a stapler to staple the final collated documents.

The PHC communicates with the devices using commands that conform to a certain protocol, the protocol being compatible with the PHC and the devices. A protocol is a set of rules or standards designed to enable devices conforming to the protocol to exchange information with each other. Some protocols also support peer-to-peer communications wherein the devices communicate directly with each other by transmitting and receiving commands sent directly to and from devices. In addition, some protocols support a broadcast mode. In broadcast mode, a command or set of commands is transmitted to more than one device from the PHC or a device.

A problem can arise if the PHC or one or more of the devices is upgraded to a newer version of the protocol. A new version of the protocol necessarily means that some commands have changed since the original version and/or some commands have been added that were not included in the original version. When this happens, the PHC may no longer be able to communicate effectively with all the devices, and/or any upgraded device may not be able to communicate effectively with the PHC and the other devices. The problem may be compounded as additional versions of the protocol are released and the PHC/devices are upgraded.

When a new version of a protocol is released for use in a PHC, the new version of the protocol supports—or is compatible with—not only the new version, but any previous versions as well. This type of compatibility is referred to as backward compatibility, i.e., more advanced versions of the protocol can still communicate with less advanced, or older, versions of the protocol. This may be done by including complete command sets for each version of the protocol, or by including the complete command set for one version of the protocol with commands from other versions of the protocol that are not included in the full command set.

If a device is upgraded to a new version of a protocol, the PHC should also be upgraded. Otherwise, the PHC may not be able to communicate fully with the device and the device would not function properly. Therefore, a printer's PHC should always include the newest version of the protocol used by the printer, as compared to the printer devices. In this way, the PHC is always compatible with the printer devices.

Another problem arises in printers that support peer-to-peer or broadcast communications when a device is upgraded to a newer version of a protocol than is used by other devices. The device supporting the newer version of the protocol can receive communications from the other devices (assuming the newer version of the protocol is backward compatible with the older version(s) of the protocol), but the devices supporting the older protocol may not understand new or changed commands from the device that supports the newer version of the protocol. Therefore, if one device is upgraded in such a printer, all devices should be upgraded.

SUMMARY

Described herein are systems and methods for translating protocol commands between devices that use different versions of a protocol. The implementations of the invention described below contemplate utilizing a translation table for each device, each translation table being configured to identify the other devices, the version of the protocol used by each of the other devices, and the commands from each version of the protocol that are compatible with the other devices.

For purposes of the present discussion, references made to a "device" mean any printer device that communicates with another printer device including, but not limited to those listed above. Furthermore, the term "device" may also used to refer to the paper handler controller (PHC) when discussing communications from one device to another.

The translation tables of the PHC and the devices translates commands between different versions of a protocol. The translation tables are used between printer devices that use different versions of the protocol for peer-to-peer and broadcast communications. Translation tables are also utilized for PHC to device communications. If basic operation information is not obtained in the translation process, then a device is identified as being "incompatible" with a certain version of a protocol command. An appropriate message may be sent to a user upon such a determination.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

The described implementations of the invention allows a printer to operate with devices that use different versions of a protocol to communicate with the printer and with each other. This means that certain devices can be upgraded without having to upgrade every device in the system to the same version of the protocol. In addition, when a PHC that is upgraded to a newer version is installed in a printer, the size of the PHC can be reduced by not including entire versions of the protocol with the PHC; only the newest version of the protocol supported by the PHC together with commands from the older versions of the protocol supported by the PHC must be included. "Printer" refers generally to any image forming device such as printers and copiers.

Figure 1:
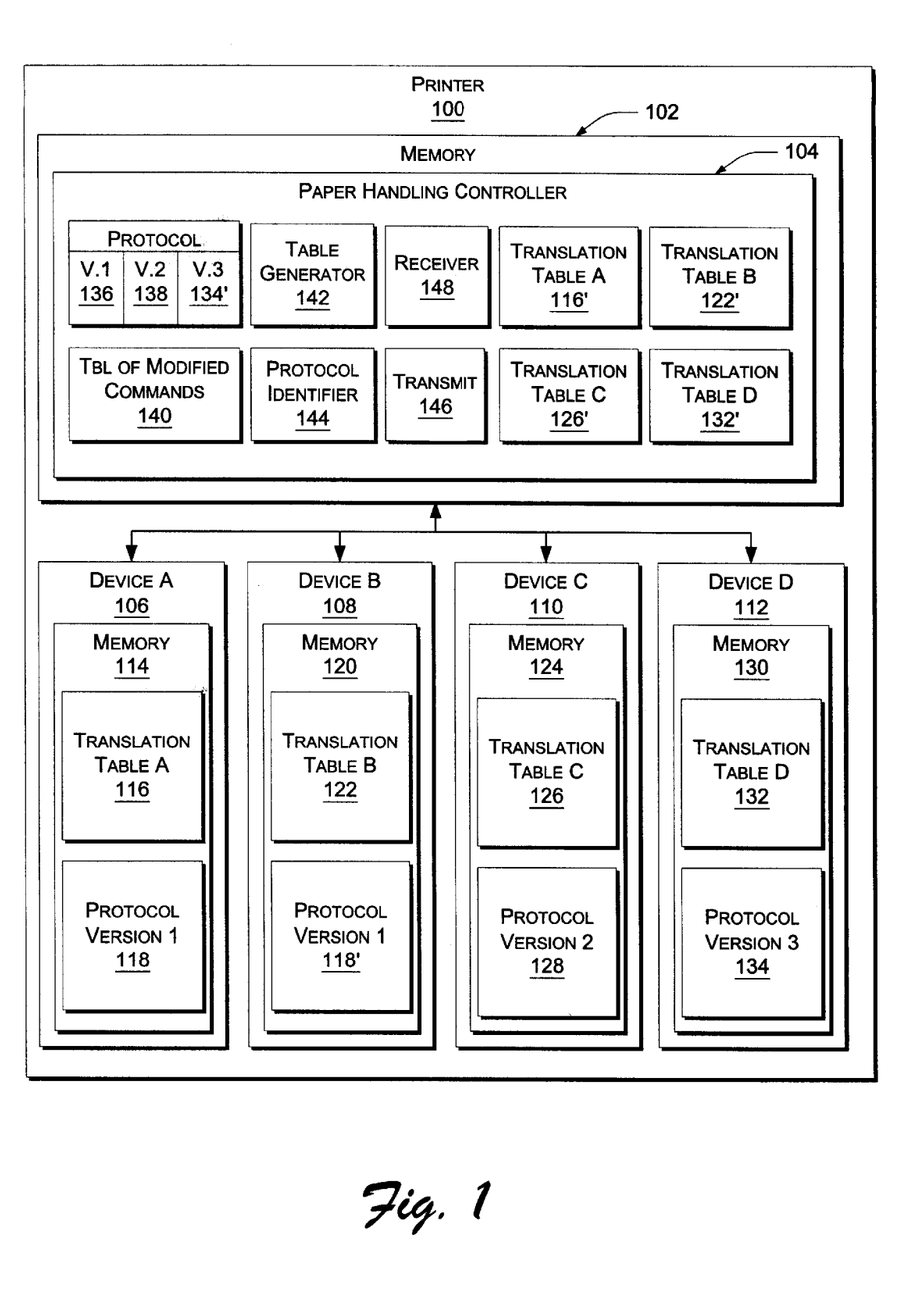
FIG. 1 is a block diagram of a printer that utilizes translation tables to communicate between devices that use different versions of a protocol.

FIG. 1 is a block diagram of a printer 100 that utilizes translation tables to communicate between devices that use different versions of a protocol. The printer 100 includes memory 102 and a paper handler controller (PHC) 104 stored in the memory 102. In addition to the PHC 104, the printer 100 includes several printer devices, designated as Device A 106, Device B 108, Device C 110, and Device D 112. These printer devices may be input trays, stackers, staplers, sorters, and the like.

Device A 106 includes memory 114 that stores translation table A 116 and a first version of a protocol 118. Device B 108 includes memory 120 that stores translation table B 122 and the first version of the protocol 118'. Device C 110 includes memory 124 that stores translation table C 126 and a second version of the protocol 128. Device D 112 includes memory 130 that stores translation table D 132 and a third version of the protocol 134.

It is noted that, while the printer 100 is shown as having four printer devices, virtually any number of printer devices may be included in the printer 100. It is also noted that, although a protocol having three versions is shown, it should be understood that a protocol used in the printer 100 may have from two to any number of versions. A printer using only one version of the protocol will have no need to use the translation facility described herein.

The PHC 104 includes commands from the first version of the protocol 136 that have changed in the second and/or third versions of the protocol. Also included are commands from the second version of the protocol 138 that were added since the first version of the protocol or that have changed in the third version of the protocol. The PCH 104 also includes the third version of the protocol 134', which is the latest version of the protocol used in the printer 100.

The PHC 104 stores a table of modified commands 140 that specifies one or more commands that differ between the versions of the protocol used in the printer. The table of modified commands 140 also identifies which commands are compatible with each version of the protocol. The table of modified commands 140 may be pre-installed in the PHC 104, but in a preferred implementation, the PHC 104 uses a table generator 142 to generate the table of modified commands 140 if a protocol identifier 144 determines that different versions of the protocol are used in the printer devices. The table of modified commands 140 will be discussed in greater detail, below, with reference to FIG. 2.

The table generator 142 uses the table of modified commands 140 to generate translation table A 116, translation table B 122, translation table C 126 and translation table D 132. Copies of translation table A 116', translation table B 122', translation table C 126' and translation table D 132' are stored in the PHC 104.

The PHC 104 includes a transmitter 146 that transmits protocol commands between the PHC 104 and the other devices 106, 108, 110, 112. The transmitter 146 is also utilized to transmit the translation tables 116, 122, 126, 132 to the devices 106, 108, 110, 112. A receiver 148 is included in the PHC 104 to receive protocol commands from the other devices 106, 108, 110, 112. Continuing reference will be made to the numbered elements contained in FIG. 1 as the implementations are further described with reference to the other figures.

Figure 2:
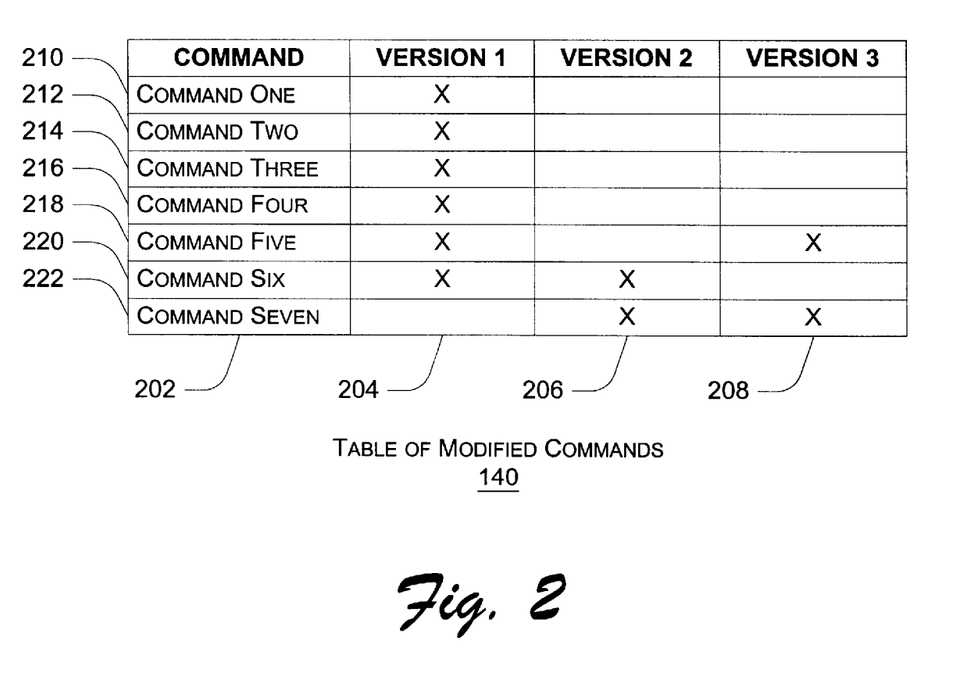
FIG. 2 illustrates a table of modified commands as used in the described implementations.

FIG. 2 illustrates the table of modified commands 140 used in accordance with the described implementations of the invention. The table of modified commands 140 includes a command column 202 that lists the commands included in each version of the protocol. The table of modified commands 140 also includes a column for each version of the protocol used in the printer 100. For the printer 100 shown, the table of modified commands 140 includes a column for version one 204 of the protocol, a column for version two 206 of the protocol, and a column for version three 208 of the protocol.

As shown, command ONE 210, command TWO 212, command THREE 214 and command FOUR 216 have not changed from version one 204 of the protocol to version three 208 of the protocol. Command FIVE 218 remained the same in version two 206 of the protocol but changed in version three 208 of the protocol. Command SIX 220 was modified in version two 206 of the protocol but remained the same in version three 208 of the protocol. Command SEVEN 222 was introduced in version two 206 of the protocol and was modified in version three 208 of the protocol.

Using the table of modified commands 140, the table generator 142 produces translation table A 116, translation table B 122, translation table C 126, and translation table D 132. The translation tables 116, 122, 126, 132 are then sent to and stored in Device A 106, Device B 108, Device C 110 and Device D 112, respectively.

Figure 3A:
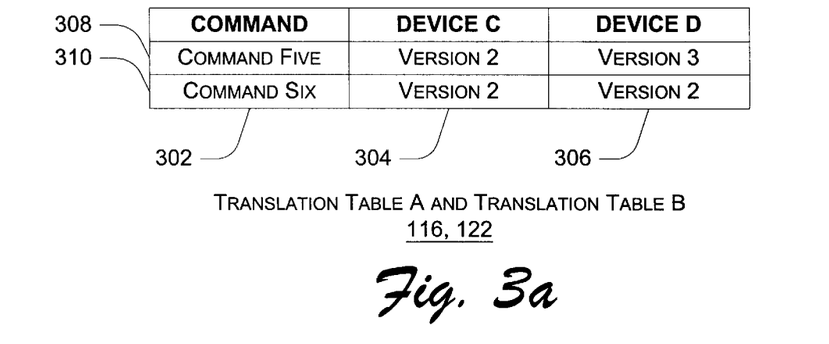
FIGS. 3a–3c illustrate translation tables used in the described implementations.

FIG. 3a illustrates translation table A 116 and translation table B 122. In this example, translation table A 116 and translation table B 122 are identical because they utilize the same version of the protocol (protocol version one 118, 118'). For convenience purposes, continued reference to this translation table will be made simply to translation table A 116.

Translation table A 116 includes a command column 302 that identifies commands that have been modified or added since the version of the protocol used in Device A 106 and Device B 108 (protocol version one 118, 118'). Translation table A 116 also includes a column for each device that uses a different version of the protocol, namely, a Device C column 304 and a Device D column 306. In the present example, a row for Command FIVE 308 is included because Command FIVE 308 changed in the versions of the protocol used by Device C 110 and Device D 112. A row for Command SIX 310 is included because Command SIX 310 changed in the version of the protocol used by Device C 110 and Device D 112.

Translation table A 116 shows that Device C 110 uses the version of Command FIVE that is included in protocol version two 128; and that Device D 112 uses the version of Command FIVE that is included in protocol version three 134. Translation table A 116 also shows that Device C 110 and Device D 112 use the version of Command SIX that is included in protocol version two 128.

It is noted that translation table A 116 does not include a row for Command SEVEN, since Device A 106 cannot send any version of Command SEVEN.

Figure 3B:
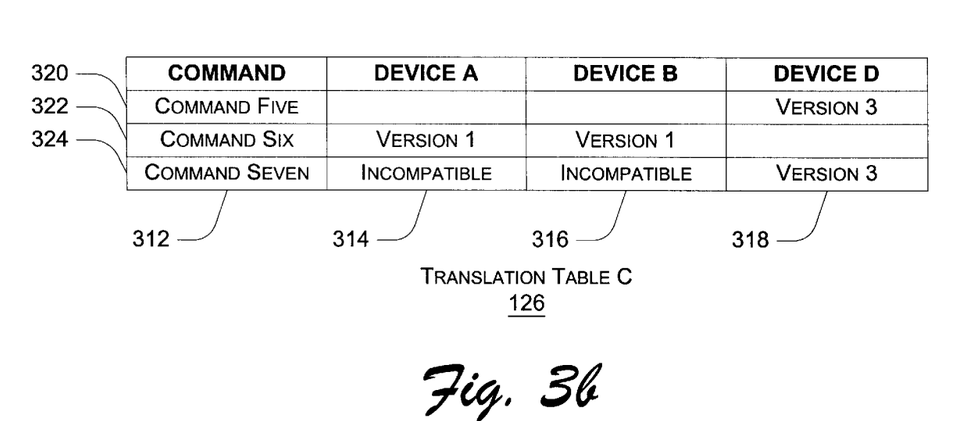

FIG. 3b illustrates translation table C 126 from Device C 110. Translation table C 126 includes a command column 312 that identifies commands that have been modified since the first version of the protocol or added in the third version of the protocol 134. Translation table C 126 also includes a column for each device that uses a different version of the protocol, namely, a Device A column 314, a Device B column 316, and a Device D column 318. In the present example, a row for Command FIVE 320 is included because Command FIVE 320 changed in the version of the protocol used by Device D 112 (protocol version three 134). A row for Command SIX 322 is included because Command SIX 322 changed since the first version of the protocol 118 (used in Device A 106 and Device B 108). A row for Command SEVEN 324 is also included because Command SEVEN 324 changed in protocol version three 134.

The row for Command FIVE 320 shows that Device A 106 and Device B 108 use the same version of Command FIVE used in Device C 110; and that Device D 112 uses the version of Command FIVE included in protocol version three 134. The row for Command SIX 322 shows that Device A 106 and Device B 108 use the version of Command SIX included in protocol version one 118; and that Device D 112 uses the same version of Command SIX used in Device C 110. The row for Command SEVEN shows that Device A 106 and Device B 108 are incompatible with Command SEVEN; and that Device D 112 uses the version of Command SEVEN included in protocol version three 134.

Figure 3C:
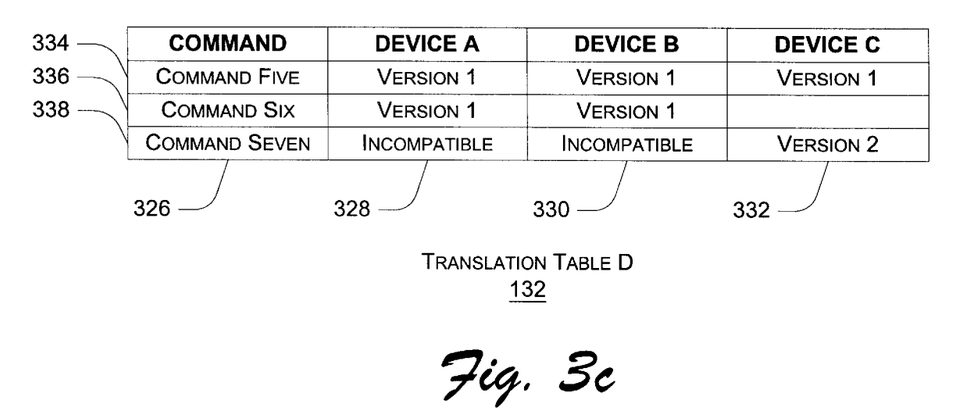

FIG. 3c illustrates translation table D 132 from Device D 112. Translation table D 132 includes a command column 326 that identifies commands that have been modified or added since the first version 118 of the protocol or the second version 128 of the protocol. Translation table D 132 also includes a column for each device that uses a different version of the protocol, namely, a Device A column 328, a Device B column 330, and a Device D column 332. In the present example, a row for Command FIVE 334 is included because Command FIVE changed from the version of the protocol used by Device D 112 to the version of the protocol used by Device A 106, Device B 108 and Device C 110 (protocol version one 118). A row for Command SIX 336 is also included because Command SIX changed since the first version of the protocol 118. A row for Command SEVEN 338 is also included because Command SEVEN changed in protocol version two 128 and protocol version three 134.

The row for Command FIVE 334 shows that Device A 106, Device B 108, and Device C 110 use the version of Command FIVE included in protocol version one 118. The row for Command SIX 336 shows that Device A 106 and Device B 108 use the version of Command SIX included in protocol version one 118; and that Device C 110 uses the same version of Command SIX used by Device D 112. The row for Command SEVEN shows that Device A 106 and Device B 108 are incompatible with Command SEVEN; and that Device C 110 uses the version of Command SEVEN included in protocol version two 128.

Figure 4:
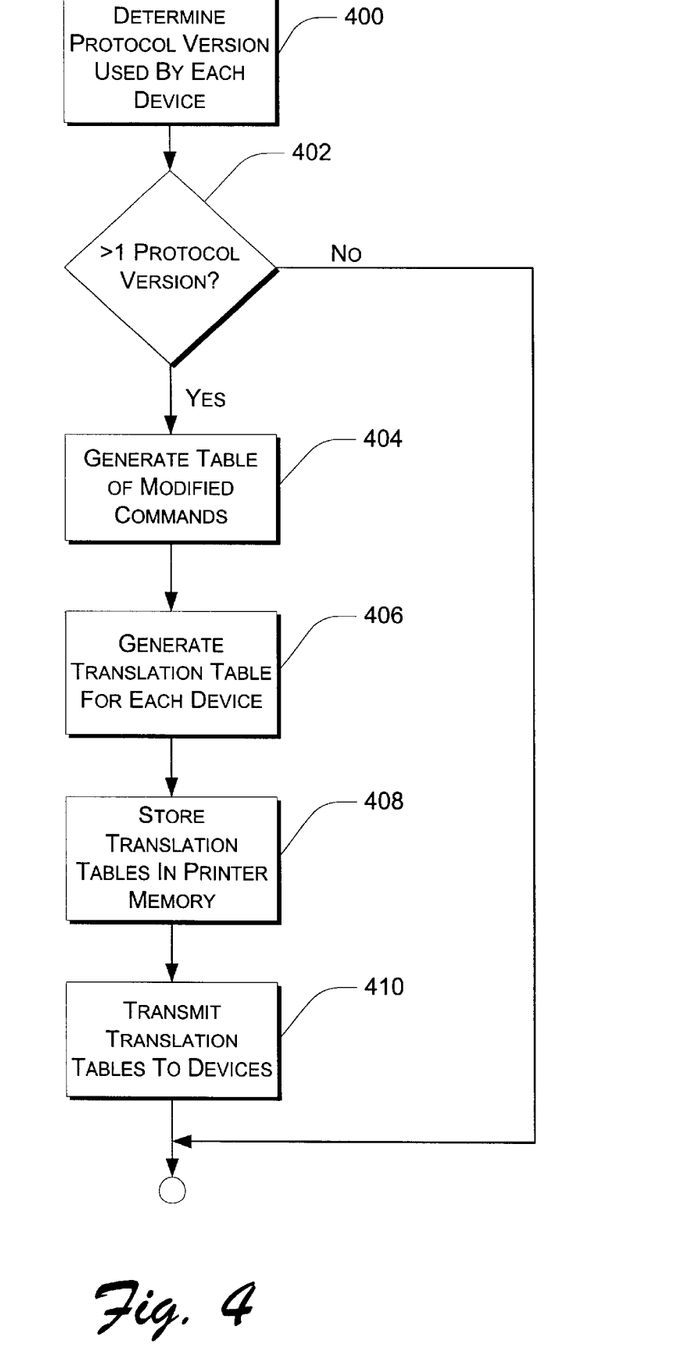
FIG. 4 is a flow diagram of a method to generate translation tables.

FIG. 4 is a flow diagram depicting the procedure that occurs when the printer 100 is booted. At step 400, the protocol identifier 144 determines which version of the protocol is used by Device A 106, Device B 108, Device C 110 and Device D 112. If the PHC 104 and the devices 106, 108, 110, 112 use the same version of the protocol, then no translation layer (i.e., no translation tables 116, 122, 126, 132 and no table of modified commands 140) is generated and processing proceeds normally ("No" branch, step 402). If, however, the protocol identifier 144 determines that more than one version of the protocol is used in the printer 100 ("Yes" branch, step 402), the table generator 142 is directed to create the table of modified commands 140 at step 404. To do this, the PHC 104 must, at a minimum, include a complete command set from one version of the protocol, together with any new or modified commands from other versions of the protocol used in the printer 100.

At step 406, the table generator 142 uses the table of modified commands 140 to generate a translation table 116, 122, 126, 132 for each device 106, 108, 110, 112, respectively. The translation tables 116, 122, 126, 132 are stored in the memory 104 of the printer 100 at step 408 before being transmitted to their respective devices at step 410, where they are stored.

Figure 5:
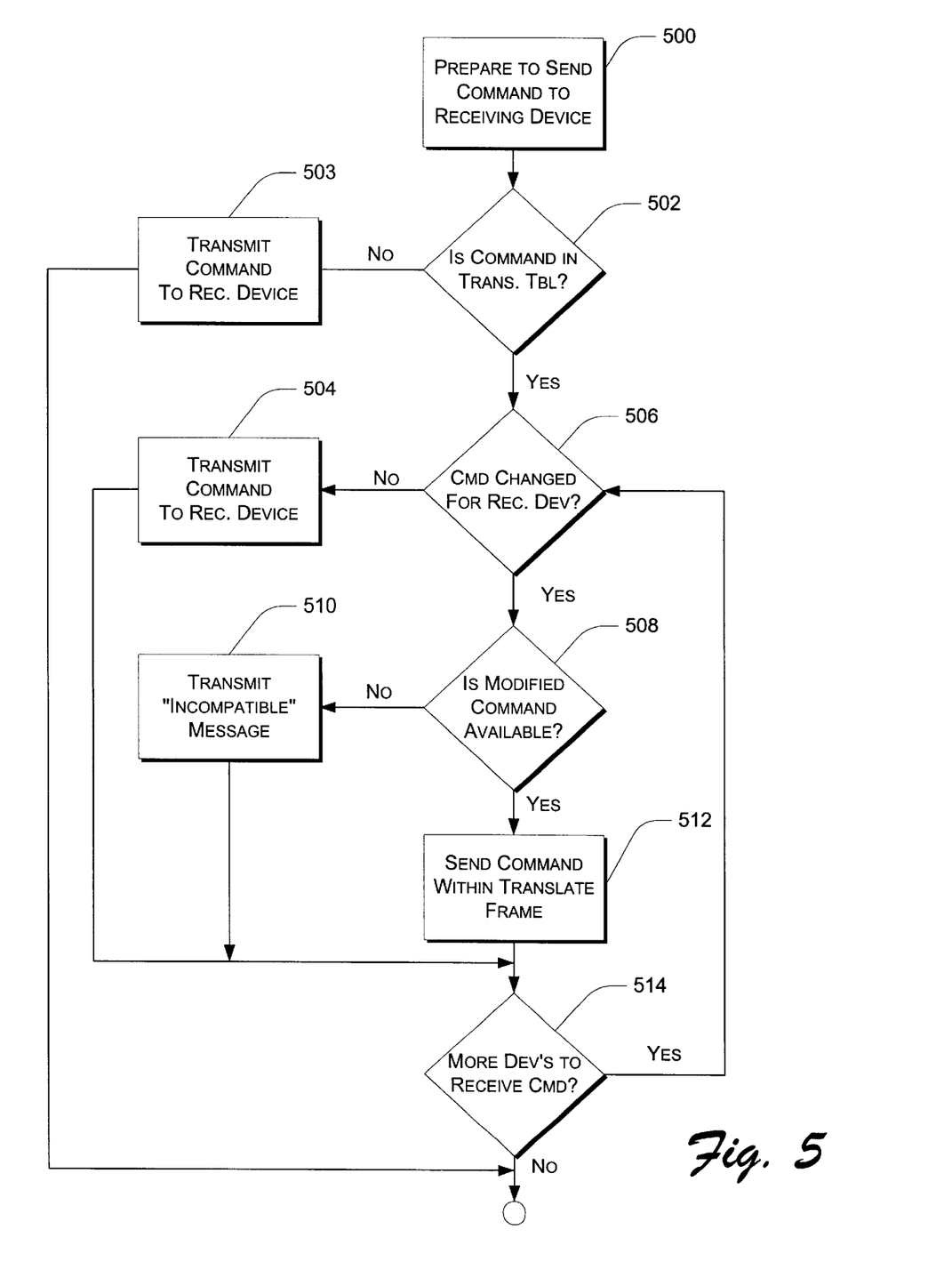
FIG. 5 is a flow diagram illustrating a procedure for utilizing translation tables to translate protocol commands from one version to another.

FIG. 5 is a flow diagram that depicts a process for translating commands from one version of a protocol to another. For purposes of discussion, an example is used of a first device sending a command to two other devices. The first device is Device A 106 of FIG. 1, and the other devices are Device B 108 and Device C 110. It is assumed that the procedure outlined in FIG. 4 has already occurred, meaning that the first device (Device A 106) has a translation table (translation table A 116) stored in memory 114.

It is noted that reference made herein to device-to-device communication does not necessarily mean that a sending device transmits commands directly to a receiving device. More typically, a sending device transmits commands to the PHC and the PHC forwards the commands to the appropriate receiving device(s). For discussion purposes, assume that the transmitted command is Command SIX, as described in FIGS. 2, 3a, 3b and 3c.

At step 500, Device A 106 prepares to send a command (Command SIX) to Device B 108. Before sending the command, Device A 106 refers to translation table A 116 stored in memory 114 of Device A 106 at step 502. If the command is not listed in translation table A 116 ("No" branch, step 502), Device A 106 transmits the command to Device B 108 at step 503, and the translation process terminates.

Since command SIX is listed in translation table A 116 ("Yes" branch, step 502), so the process continues at step 506. At step 506, a determination is made as to whether the command has been modified in the version of the protocol used by the destination device. Since both Device A 106 and Device B 108 use the same version of the protocol (protocol version one 118, 118'), translation table A 116 indicates that Command SIX has not been modified from the version of the protocol used in the sending device (Device A 106) to the version of the protocol used in Device B 108, the receiving device ("No" branch, step 506). Therefore, at step 504, Command SIX is transmitted to the PHC 104 for further transmission to Device B 108.

If more devices are to receive the command ("broadcast mode"), the process is repeated ("Yes" branch, step 514). In the present example, Command SIX is also to be transmitted to Device C 110, so Device A 106 prepares to send Command SIX to Device C 110 at step 500. Device A 106 refers to translation table A 116 at step 502 to see if Command SIX is listed in translation table A 116. Command SIX is listed, so Device A determines if a different version of Command SIX is listed in translation table A 116 for Device C 110 (step 506). Translation table A 116 indicates that Device C 110 uses a different version of Command SIX ("Yes" branch, step 506) so Device A 106 determines whether there is a modified Command SIX available at step 508. If there is not a modified command available ("No" branch, step 508), an "incompatible" message is transmitted at step 510. This message is transmitted to the PHC, which handles the message to indicate an error to the user.

In the present example, translation table A 116 indicates that a modified Command SIX is available that is compatible with Device C 110 ("Yes" branch, step 508), so Device A 106 encapsulates Command SIX within a translate frame, and transmits the translate frame to the PHC 104, where a modified Command SIX is forwarded to Device C 110 (step 512).

At step 514, there are no other devices that are to receive the command from Device A 106, so the process terminates ("No" branch, step 514).

CONCLUSION

The described implementations advantageously provide for an effective way to provide backward compatibility to PHCs and printer devices while allowing a printer to utilize printer devices that use different versions of a protocol.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. In a printing system having a controller and multiple devices that utilize more than one version of a protocol, a method of translating a first protocol version command to a second protocol version of the command, the method comprising:

identifying a protocol version used by each device;

generating a translation table for each device;

utilizing the translation table for a first device to translate the first protocol version command to the second protocol version of the command when transmitting the command from the first device to a second device; and wherein the first device uses a first version of the protocol and the second device uses a second version of the protocol.

2. The method as recited in claim 1, further comprising storing the translation table for a device in memory of the device.

3. The method as recited in claim 1, further comprising storing a first copy of the translation table for a device in memory of the device and storing a second copy of the translation table in memory of the controller.

4. The method as recited in claim 1, wherein the generating a translation table for each device comprises:

identifying one or more commands that have changed between the first version of the protocol and the second version of the protocol;

creating a first translation table for the first device, the first translation table identifying the one or more commands that have changed that are used by the second device; and creating a second translation table for the second device, the second translation table identifying the one or more commands that have changed that are used by the first device.

5. The method as recited in claim 1, wherein the utilizing the translation table for a first device further comprises:

prior to transmitting the command from the first device to a second device, referring to the translation table to determine if the command has changed between the version of the protocol used by the first device and the version of the protocol used by the second device; and if the command has changed, transmitting the second protocol version of the command in place of the first protocol version command.

6. The method as recited in claim 1, wherein the controller supports each of the multiple versions of the protocol.

7. The method as recited in claim 1, further comprising indicating that the first protocol version command is incompatible with the second device if the translation table indicates that a modified command corresponding to the command is unavailable.

8. A printer, comprising:

memory;

a first device having memory, the first device being compatible with a first version of a protocol;

a second device having memory, the second device being compatible with a second version of the protocol;

a controller stored in the memory, the controller being compatible with the first version of the protocol and the second version of the protocol;

a translation table stored in the memory of the first device, the translation table configured to identify the second device, the version of the protocol used by the second device and commands from the first version of the protocol that are compatible with the second device; and wherein the first device is configured to:

refer to the translation table to determine whether a command belonging to the first version of the protocol is compatible with the second device and, if not, determine if there is a modified command belonging to the second version of the protocol which corresponds to the command;

transmit the command to the second device if the command is compatible with the second device;

transmit the modified command to the second device if the command is not compatible with the second device and such a modified command is available; or transmit an "incompatible" message to the controller if the command is not compatible with the second device and such a modified command is not available.

9. The printer as recited in claim 8, wherein the controller is further configured to generate the translation table.

10. The printer as recited in claim 8, wherein the controller includes controller memory and a copy of the translation table is stored in the controller memory.

11. The printer as recited in claim 8, further comprising a table of modified commands, the table of modified commands identifying one or more commands that differ between the first version of the protocol and the second version of the protocol and specifying which commands are compatible with each version of the protocol.

12. The printer as recited in claim 11, wherein the controller is further configured to generate the translation table using the table of modified commands and store the translation table in the memory of the first device.

13. The printer as recited in claim 8, wherein the controller is compatible with the first version of the protocol and the second version of the protocol.

14. The printer as recited in claim 8, further comprising:

a second translation table stored in the memory of the second device, the translation table configured to identify the first device, the version of the protocol used by the first device and commands from the second version of the protocol that are compatible with the first device, and wherein the second device is further configured to:

refer to the second translation table to determine whether a command belonging to the second version of the protocol is compatible with the first device and, if not, determine if there is a modified command belonging to the first version of the protocol which corresponds to the command;

transmit the command to the first device if the command is compatible with the first device;

transmit the modified command to the first device if the command is not compatible with the first device and such a modified command is available; or transmit an "incompatible" message to the controller if the command is not compatible with the first device and such a modified command is not available.

15. A paper handling controller, for use in a printing system having multiple devices that use different versions of a protocol, comprising:

a protocol identifier configured to identify the version of the protocol that is used by each device;

a table generator configured to generate a translation table for each device, each translation table being configured to identify the other devices, the version of the protocol used each of the other devices, and commands from each version of the protocol that are compatible with the other devices;

a transmitter configured to transmit protocol commands to each of the devices;

a receiver to receive protocol commands from each of the devices; and wherein a translation table for a first device is used by the first device to translate a command of a first version of the protocol used by the first device to a modified command of a second version of the protocol used by a second device prior to transmitting the modified command to the second device.

16. The paper handling controller as recited in claim 15, wherein the table generator is further configured to generate a table of modified commands that identifies one or more commands that differ between the first version of the protocol and the second version of the protocol and specifying which commands are compatible with each version of the protocol.

17. The paper handling controller as recited in claim 15, wherein the translation table for the first device identifies at least the second device and commands that have changed between the first version of the protocol and the second version of the protocol, and which further identifies which version of the protocol command is compatible with the second device.

18. The paper handling controller as recited in claim 15, wherein the transmitter is further configured to transmit a translation table for a device to the device, where it is stored in device memory.

19. The paper handling controller as recited in claim 15, wherein the table generator is further configured to store a copy of each translation table is printer memory when each translation table is generated.

20. A printing device containing the paper handling controller as recited in claim 15.

* * * * *